G. A. BOUVIER.
ADJUSTABLE FRAME FOR SHIPPING VEHICLES.
APPLICATION FILED JULY 9, 1919.
1,350,699.
Patented Aug. 24, 1920.
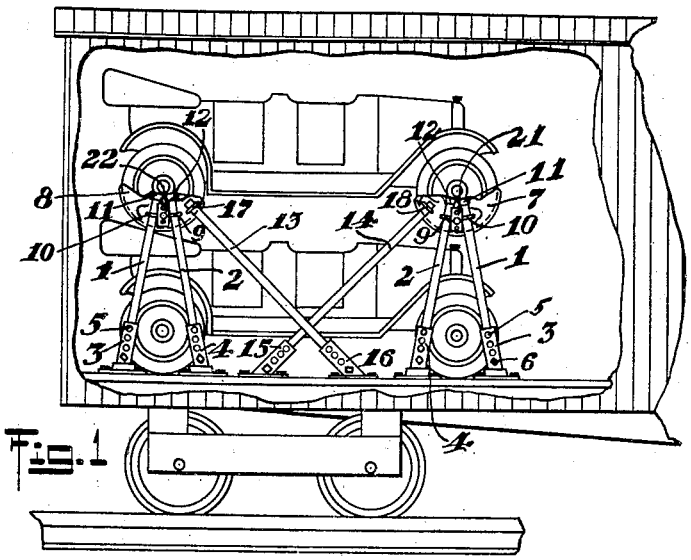
Fig. 1
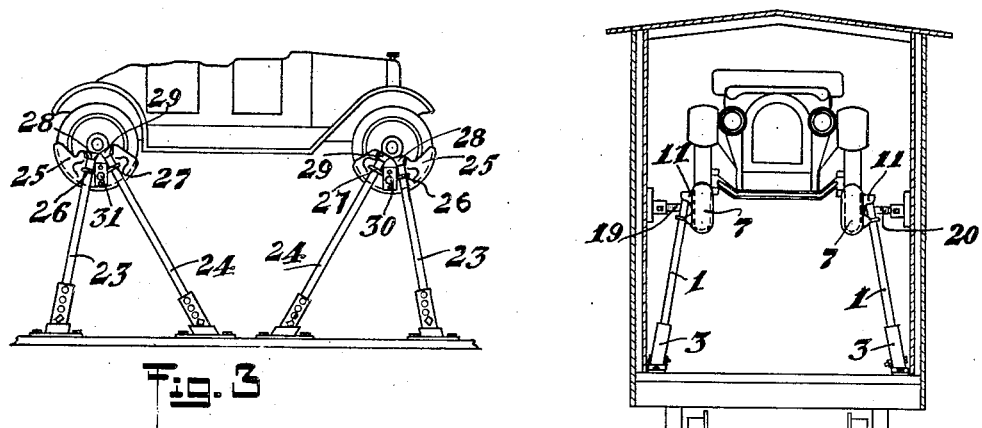
Fig. 3
Fig. 2
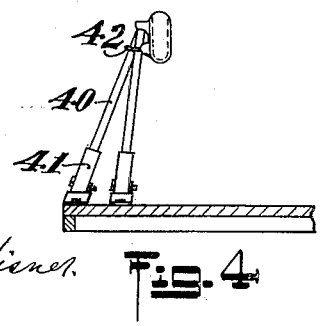
Fig. 4
WITNESS:
INVENTOR
George A. Bouvier
BY
ATTORNEY

UNITED STATES PATENT OFFICE.

GEORGE A. BOUVIER, OF DETROIT, MICHIGAN.

ADJUSTABLE FRAME FOR SHIPPING VEHICLES.

1,350,699.   Specification of Letters Patent.   Patented Aug. 24, 1920.

Application filed July 9, 1919. Serial No. 309,566.

*To all whom it may concern:*

Be it known that I, GEORGE A. BOUVIER, a citizen of the United States, residing at Detroit, county of Wayne, State of Michigan, have invented a certain new and useful Improvement in Adjustable Frames for Shipping Vehicles, and declare the following to be a full, clear, and exact description of the same, such as will enable others skilled in the art to which it pertains to make and use the same, reference being had to the accompanying drawings, which form a part of this specification.

This invention relates to adjustable frames for shipping vehicles, and the object of the invention is to provide a frame which may be easily secured to a freight car floor and adapted to support one vehicle above another. When shipping large quantities of automobiles or other vehicles, the shipment charge is rated per freight car, it being immaterial how many vehicles are shipped in a car. Thus, with this invention, two vehicles may be shipped in the same space taken formerly by one and the shipping cost reduced fifty per cent. per vehicle to the manufacturer. A further object of the invention is to provide an adjustable frame for vehicles in which the height of the vehicle from the car floor is adjustable to allow a larger or smaller vehicle to be placed beneath the first named vehicle. An additional object of the invention is to provide an adjustable frame for shipping vehicles provided with means preventing longitudinal movement of the framework and also provided with means preventing transverse movement thereof. A further object of the invention is to provide a unit frame construction for each vehicle wheel adapted to be tightened after the vehicle is positioned in such manner that the assembled vehicle and the unit form a rigid frame stayed against longitudinal or transverse movement. These and other objects and the several novel features of the invention are hereinafter more fully described and claimed and shown in the accompanying drawings in which—

Figure 1 is a view of part of a freight car with the siding thereof cut away showing the method of packing one vehicle above another and the adjustable frame for so doing.

Fig. 2 is a section through a freight car showing an end view of the vehicle and the adjustable frame for positioning the same within the car.

Fig. 3 shows an alternative form of the device.

Fig. 4 shows a means of bracing the device when mounted on a flat car.

The device as shown in Fig. 1 consists of two upright metal tubes 1 and 2 for each vehicle wheel which rest in the sockets 3 and 4 respectively secured to the floor of a freight car. These sockets are provided with several apertures 5 in which a bolt 6 secured to the tubes 1 and 2 may be positioned. This bolt 6 is secured in the ends of the tubes 1 and 2 and, by positioning this bolt in different holes 5, raising or lowering of the vehicle may be accomplished. At the upper ends the rods 1 and 2 are secured to the wheel receptacles 7 and 8 by U shaped bolts 9 and 10 in each wheel receptacle and, at the upper ends of the rods 1 and 2 portions 11 and 12 of the wheel receptacle are bent over to prevent the receptacle from any possibility of slipping down on the rods 1 and 2. As an extra support and brace, hollow metal tubes 13 and 14 are provided fitting in sockets 16 and 15 respectively secured to the car floor and secured to the wheel receptacle at 17 and 18 by U shaped bolts. As is shown in Fig. 2, jacks 19 and 20 are secured to the walls of the freight car and provided with heads 21 and 22 as shown in Fig. 1 secured to the outer face of the wheel receptacle and adapted to firmly engage the wheel receptacles to prevent any side sway of the framework and vehicle therein. When the device is mounted on a flat car as shown in Fig. 4, I provide an angular brace 40 secured to the flat car floor in a socket 41 and secured to the wheel receptacle by a U shaped bolt 42 to prevent transverse movement of the vehicle as shown in said figure. By adjusting the brace 40 in the socket 41, the wheel receptacles on each side of the vehicle may be moved to tightly engage the vehicle in place.

An alternative form of the device is shown in Fig. 3 consisting of hollow metal tubes 23 and 24 secured to each wheel receptacle 25 by the U shaped bolts 26 and 27 and prevented from sliding on the said metal tubes by the projecting portions 28 and 29 of the wheel receptacle engaging the ends of the tubes 23 and 24 respectively. The metal tubes 23 and 24 are secured to the freight car floor in the same manner as shown in Fig. 1, the two tubes 24 preventing end sway of the machine, and the tubes 23 providing upright support for the machine, and it is to be understood that jacks are secured to the wheel receptacles at 30 and 31 and also to the car walls as in the other form of the device to prevent transverse motion of the framework. When the device is used by a manufacturer making a great many vehicles of the same model and size, the adjustable features may be done away with. In that case the braces are made of one piece and secured to the car floor. The vehicles being all of the same size, the only adjustable features necessary are the jacks 19 and 20, or the braces 40 shown in Fig. 4 to allow for slight variations in the widths of the freight cars and to tightly bind the vehicles from transverse motion.

In operation, a vehicle is placed in the car within the framework and the framework is adjusted so that the wheel receptacles will clear any part of the said vehicle, whereupon an additional vehicle is placed in the wheel receptacles and the jacks 19 and 20 turned up to tightly engage the framework and vehicle to prevent movement thereof. By this means one vehicle is positioned above another throughout the length of the freight car and thus two vehicles may be shipped where only one could be formerly shipped and, as before mentioned, the shipping charge being rated per freight car by shipping twice the number of vehicles per car, the shipping rate per vehicle is reduced fifty per cent. It is to be particularly noted that in my device, the vehicle is wholly supported by the vehicle wheels in the wheel receptacles 7 as shown and not by the axles or hubs as is done in some other devices. As there are no supports connected to the vehicle, the vehicle is supported in its natural position on the wheel tires, the wheel receptacles being of sufficient depth to hold the vehicle from movement.

Having thus briefly described my invention, its utility and mode of operation, what I claim and desire to secure by Letters Patent of the United States is—

1. In a shipping frame for vehicles, a semicircular wheel receptacle for each vehicle wheel, a pair of metal tubes secured to each wheel receptacle extending outwardly therefrom at an angle to a vertical plane passing through the longitudinal axis of the vehicle and sockets on the lower ends of the said tubes in which the said tubes are adjustable.

2. In a shipping frame for vehicles, a semicircular wheel receptacle for each vehicle wheel in which the vehicle is mounted, a pair of tubes secured to each wheel receptacle at the upper end, sockets at the lower ends of the said tubes in which the said tubes are adjustable, and an additional tube secured to the wheel receptacle and positioned diagonally to prevent end sway of the vehicle.

3. In a frame for shipping vehicles in a freight car, wheel receptacle for each vehicle wheel semicircular in shape, metal tubes secured to the wheel receptacles, sockets secured to the freight car floor in which the said tubes are adjustable, and a jack for each wheel receptacle secured to the freight car wall and engaging against each wheel receptacle to prevent side sway of the vehicle within the freight car.

4. In a frame for shipping vehicles in a freight car, a unit supporting each vehicle wheel consisting of a semicircular wheel receptacle shaped to fit about the wheel, rim and tire and of a depth approximately equal to the radius of the vehicle wheel, a vertical support for the wheel receptacle adjustable in length and secured to the freight car floor, a diagonal support for the wheel receptacle preventing longitudinal movement thereof and an adjustable support preventing transverse movement of the wheel receptacle.

5. In a support for vehicles, adjustable means for positioning the vehicle vertically, means preventing longitudinal movement thereof adjustable to correspond with the vertical adjustment, and adjustable means preventing transverse movement of the vehicle.

6. In a support for vehicles, a wheel receptacle for each vehicle wheel consisting of a semicircular wheel receptacle shaped to fit the wheel and of a depth approximately equal to the radius of the vehicle wheel, vertically adjustable means for supporting the wheel receptacles, means preventing longitudinal movement of the wheel receptacles adjustable to correspond with the vertical adjustment, and adjustable means preventing transverse movement of the wheel receptacles.

7. In a support for vehicles, a unit supporting each vehicle wheel, consisting of a wheel receptacle, semicircular in shape and of a depth approximately equal to the radius of the vehicle wheel, an adjustable vertical support for each wheel receptacle, a diagonal support for each wheel receptacle adjustable to correspond with the vertical adjustment, and an adjustable support preventing transverse movement of the wheel receptacle and vehicle therein, the construction being such that the units in combination with the vehicle when assembled form a rigid framework.

8. In a support for vehicles, a unit supporting each vehicle wheel, consisting of a wheel receptacle shaped to receive the wheel, a pair of supports extending from each wheel receptacle in the shape of an inverted V, the said supports extending at an angle to a vertical plane passing through the longitudinal axis of the vehicle, and adjustable means for preventing transverse movement of the vehicle and wheel supporting units, the construction being such that the units in combination with the vehicle when assembled form a rigid framework.

In testimony whereof I sign this specification.

GEORGE A. BOUVIER.